Patented July 20, 1948

2,445,520

UNITED STATES PATENT OFFICE 2,445,520

SEPARATION OF OLEFINS

Alfred W. Francis, Woodbury, N. J., and Ebenezer E. Reid, Baltimore, Md., assignors to Socony-Vacuum Oil Company, Incorporated, a corporation of New York No Drawing. Application November 20, 1946, Serial No. 711,202

9 Claims. (Cl. 260—677)

This invention relates to a process for the separation or concentration of olefin hydrocarbons by absorption in an aqueous solution of cuprous chloride. More particularly the invention is directed to the improvement in processes of the aforementioned type by addition to the aqueous solution of N-alkyl amides and hydrochloric acid.

The capacity of aqueous solution of certain metal salts to selectively absorb olefins has been recognized for some time. The processes have not come into extensive commercial use, primarily because of difficulties encountered in continuous operations which are not balanced economically by the efficiency of the processes. One suggested combination is an aqueous solution of cuprous nitrate and ethanolamine. The solution has a high capacity to absorb ethylene, propylene and other olefins, but the viscosity of the solution is so high that rapid intimate contact is impossible and very large equipment is required to insure satisfactory operation. Many of the solutions proposed decompose during use with deposits of elementary metals or decomposition of one or more components.

Amides have been proposed as solubilizing agents for the metal salts, but in general their capacities are relatively low as compared with the amide derivatives of this invention wherein one or more hydrogen atoms of the amido group is replaced by an alkyl radical.

The preferred embodiment of the invention is a solution of cuprous chloride in aqueous dimethyl acetamide, containing a small amount of hydrochloric acid. This solvent absorbs an unexpectedly large volume of olefins, taking up 38 to 128 volumes of propylene in one volume of solution, depending on the concentration of hydrochloric acid and on the temperature of the operation. This is several times as much as can be absorbed by solution of cuprous chloride in formamide and hydrochloric acid or in hydrochloric solutions alone, and is considerably greater than the amount absorbed by aqueous solution of acetamide and hydrochloric acid or cuprous nitrate in aqueous solution of ethanolamine.

The selectivity of this solution with respect to olefins varies somewhat with concentration of hydrochloric acid and this variation is somewhat greater than the corresponding properties of acetamide solutions.

The solutions of this invention are relatively non-viscous and can be saturated with gaseous olefin quite readily. Recovery of the olefin by heating at reduced pressure is also expedited by low viscosities of the solution to which this invention is directed.

Concentrations of the various components may vary over rather wide limits. Very small amounts of cuprous chloride and N-alkyl amides suffice to give some absorption of olefins. For maximum capacity, the concentration of the metal salt should be as high as possible, preferably 25 to 50% by weight. Some hydrochloric acid is essential, since cuprous chloride is only slightly soluble in aqueous solutions of such compounds as dimethyl acetamide. High concentrations of hydrochloric acid tend to increase the viscosity and render the solution more corrosive, as well as giving a lower solvent power for the olefin. Preferably the solution contains from 5 to 60% by weight of concentrated hydrochloric acid. Within the lower portion of this range the solvent power for olefin is very high, but the selectivity is decreased due to substantial solubility of paraffins in this range. Concentration of the components should be adjusted for any desired purpose to obtain a balance among the several factors of solvent power, selectivity, viscosity and other factors.

The process is well adapted to combination with cracking of hydrocarbons under conditions to give high yields of olefins wherein it readily provides a paraffinic recycle stream to be returned to the cracking step, without recycling of substantial quantities of olefins which are subject to secondary reactions leading to production of aromatic by-products.

It is accordingly a principal object of the invention to provide a method for rapid and efficient separation of olefins from mixtures thereof with paraffins having substantially the same boiling point. Additional objects will be apparent from consideration of experimental data reported below, comparing the solvents of this invention with related compositions known to the prior art.

EXAMPLE I

Gases rich in ethylene are prepared by passing light gaseous paraffins containing ethane and propane through a bed of inert granular solid at 1700° F. The effluent gases are then cooled and fractionated to produce a mixture consisting primarily of ethane and ethylene. This mixture is contacted counter-current in a packed tower at 25° C. and 11.6 atmosphere with a solution containing 35% by weight of cuprous chloride, 15% by weight of concentrated hydrochloric acid and 50% dimethyl acetamide. The off-gases from the absorption step are recycled to the cracking step and the enriched solvent is stripped by passing it continuously through a packed tower at 60° C. and atmospheric pressure to recover the ethylene.

The efficiency of the solvents of this invention is best shown by a series of comparative runs in which the present invention is typified by the preferred compound, dimethyl acetamide. The derivatives of amides are preferred, and in general the derivatives having alkyl groups totalling two carbon atoms substituted at the amide nitrogen are preferred. The compounds of this preferred group are, of course, dimethyl acetamide, dimethylformamide and monoethylacetamide. Experiments were made to find the relative solubilities of propylene in various solutions of cuprous salts. These were made in a thick glass tube into which the reagents were weighed successively. Propylene was condensed into the tube while cooling it in a Dry-Ice bath at minus 78° C. The tube was then sealed, warmed to room temperature and weighed. The position of the interface and meniscus were read on a scale before shaking and again after vigorous shaking and settling. The relative decrease in depth of the upper layer multiplied by the weight of hydrocarbon added gave the amount of dissolved hydrocarbon. This method of calculation was checked in several cases against the volume of gas later evolved and found to be accurate.

Results using propylene are shown in Table I which include the best results (highest solubility) observed for each solvent. Some of the better solvents were tested also with propane to show the selectivity between olefins and paraffins, as reported in Table II. The solution used in Examples 11 to 14 inclusive was tested with a mixture of propane and propylene at various temperatures, as shown in Table III. A single extraction can be made to give practically pure olefin and paraffin gases from a mixture of the two.

TABLE I

Solubility of liquid propylene in cuprous salt solutions at room temperature (25° C. and 11.6 atm.)

| Example | Solvent, Per Cent | | Per Cent CuCl | Per Cent Concd. HCl | Solubility | |
|---|---|---|---|---|---|---|
| | | | | | Wt. Per Cent | Vol./Vol. NTP |
| 2 | Hydrochloric Acid | 76 | 24 | 76 | 2.1 | 16. |
| 3 | Ethanolamine | 30 | 15 | [1] 8.4 | 1.5 | 9. |
| 4 | ....do | 28 | 53 | 19 | 2.8 | 26. |
| 5 | Formamide | 47 | 27.5 | 25 | 2.7 | 20.5. |
| 6 | Pyridine | 31.4 | 9.5 | [1] 0 | 1.8 | 10.7. |
| 7 | Acetamide | 49.5 | 31 | 19.5 | 3.85 | 28. |
| 8 | Urea | 52 | 23 | 25 | 4.5 | 30. |
| 9 | Dimethylacetamide | 40 | 31 | 29 | 5.0 | 38. |
| 10 | ....do | 38 | 32 | 30 | 4.5 | 34. |
| 11 | ....do | 40 | 36 | 24 | 5.4 | 41.6. |
| 12 | ....do | 40 | 36 | 24 | 5.3 | 40.6. |
| 13 | ....do | 40 | 36 | 24 | 6.2 | 53 at 14° C. |
| 14 | ....do | 40 | 36 | 24 | 7.4 | 63 at 11° C. |
| 15 | ....do | 42 | 50 | 8 | 6.9 | 60. |
| 16 | ....do | 50 | 35 | 15 | 7.8 | 61. |
| 17 | ....do | 48.7 | 44 | 7.3 | 15.3 | 128. |
| 18 | Dimethylformamide | 33 | 43 | 24 | 7.4 | 63. |
| | | | Per Cent CuNO$_3$ | | | |
| 19 | Ethanolamine | 55 | [1] 19 | | 4.8 | 38. |
| 20 | ....do | 42 | [2] 33 | | 4.1 | 30. |

[1] Remainder water.
[2] Remainder, 9% NH$_4$NO$_3$, 9% NH$_4$OH, 7% water.

TABLE II

Relative solubility of liquid propylene and propane in cuprous chloride solutions at room temperature (see Table I for concentrations)

| Example | Solvent | Solubility Vols./Vol. N. T. P. | | |
|---|---|---|---|---|
| | | Propylene | Propane | Ratio |
| 5 | Formamide | 20.5 | 0 | 00. |
| 7 | Acetamide | 28 | 5 | 5.6. |
| 9 | Dimethylacetamide | 38 | 0 | 00. |
| 14 | ....do | 63 | 4.1 | 15.3 at 11° C. |
| 17 | ....do | 128 | 12.7 | 10. |
| 18 | Dimethylformamide | 63 | 12.4 | 5.1. |

TABLE III (EXAMPLE 21)

Extraction of propylene from a propane mixture using the solvent of Examples 11–14

| Temperature | Solubility (Vols./Vol.) |
|---|---|
| 25° C | 17.7 |
| 0° C | 26.3 |
| −6° C | 55 |

Composition, per cent propylene

Feed ......................................... 43
Extract [1] ................................. 96
Raffinate [1] .............................. 3.5

[1] At −6° C.

We claim:

1. A process for the recovery of olefins from gaseous mixtures of saturated and unsaturated hydrocarbons which comprises contacting said mixtures with an aqueous solution of cuprous chloride, an N-alkyl amide and hydrochloric acid and thereafter expelling olefins from said aqueous solution.

2. A process for the recovery of olefins from gaseous mixtures of saturated and unsaturated hydrocarbons which comprises contacting said mixtures with an aqueous solution containing 25 to 50% by weight of cuprous chloride, and N-alkyl amide and hydrochloric acid and thereafter expelling olefins from said aqueous solution.

3. A process for the recovery of olefins from gaseous mixtures of saturated and unsaturated hydrocarbons which comprises contacting said mixtures with an aqueous solution containing cuprous chloride, an N-alkyl amide and 5 to 60% by weight of hydrochloric acid and thereafter expelling olefins from said aqueous solution.

4. A process for the recovery of olefins from gaseous mixtures of saturated and unsaturated hydrocarbons which comprises contacting said mixtures with an aqueous solution containing 25 to 50% by weight of cuprous chloride, an N-alkyl amide and 5 to 60% by weight of hydrochloric acid and thereafter expelling olefins from said aqueous solution.

5. A process for the recovery of olefins from gaseous mixtures of saturated and unsaturated hydrocarbons which comprises contacting said mixtures with an aqueous solution of cuprous chloride, an N-alkyl amide in which the N-alkyl groups have a total of two carbon atoms and hydrochloric acid and thereafter expelling olefins from said aqueous solution.

6. A process for the recovery of olefins from gaseous mixtures of saturated and unsaturated hydrocarbons which comprises contacting said mixtures with an aqueous solution of cuprous chloride, dimethyl acetamide and hydrochloric acid and thereafter expelling olefins from said aqueous solution.

7. A process for the recovery of olefins from gaseous mixtures of saturated and unsaturated hydrocarbons which comprises contacting said mixtures with an aqueous solution of cuprous chloride, dimethyl formamide and hydrochloric acid and thereafter expelling olefins from said aqueous solution.

8. A process for the recovery of propylene from gaseous mixtures of saturated and unsaturated hydrocarbons which comprises contacting said mixtures with an aqueous solution of cuprous chloride, an N-alkyl amide and hydrochloric acid and thereafter expelling propylene from said aqueous solution.

9. A process for the recovery of ethylene from gaseous mixtures of saturated and unsaturated hydrocarbons which comprises contacting said mixtures with an aqueous solution of cuprous chloride, an N-alkyl amide and hydrochloric acid and thereafter expelling ethylene from said aqueous solution.

ALFRED W. FRANCIS.
EBENEZER E. REID.

REFERENCES CITED

The following references are of record in the file of this patent:

UNITED STATES PATENTS

| Number | Name | Date |
| --- | --- | --- |
| 1,977,659 | Watts | Oct. 23, 1934 |
| 1,999,159 | Van Peski | Apr. 23, 1935 |
| 2,386,044 | Fasce | Oct. 2, 1945 |